(No Model.)
R. S. WARING.
LEAD ARMORED ELECTRIC CABLE.
No. 268,158. Patented Nov. 28, 1882.
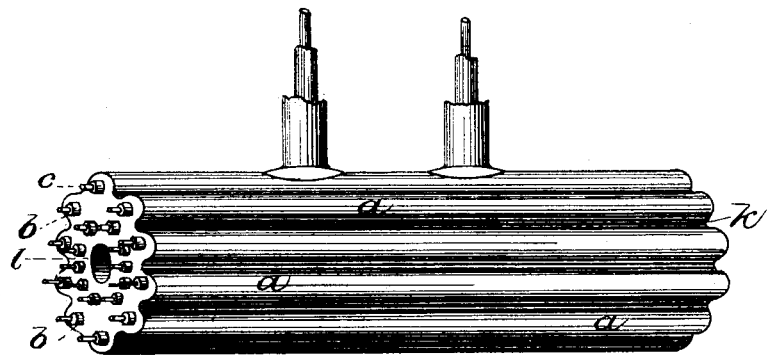
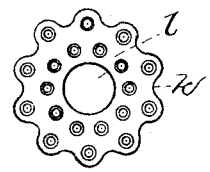
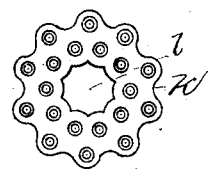
Witnesses:
J. W. Reynolds, Jr.
Edward E. Ellis
Inventor
R. S. Waring
per O. E. Duffy
Att'y

United States Patent Office.

RICHARD S. WARING, OF PITTSBURG, PENNSYLVANIA.

LEAD-ARMORED ELECTRIC CABLE.

SPECIFICATION forming part of Letters Patent No. 268,158, dated November 28, 1882.

Application filed August 23, 1882. (No model.)

*To all whom it may concern:*

Be it known that I, RICHARD S. WARING, of Pittsburg, in the county of Allegheny and State of Pennsylvania, have invented certain new and useful Improvements in Lead-Armored Electric Cables; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in cables for the transmission of electric currents of that class which comprises all those that have an armor or tubular body of lead or other ductile material formed with longitudinal ribs, and have an insulated wire or electric conductor within each one of said ribs, the said invention being an improvement upon the invention for which I made application for Letters Patent of the United States on the 27th day of September, 1881, Serial No. 42,699, which application is now pending in the United States Patent Office.

My invention consists in an electric cable consisting of a tubular body of lead or other ductile material, having external longitudinal ribs, and two or more series of concentrically-grouped insulated wires extending through said body, each wire of the outer series extending through one of the ribs of the cable.

In the drawings, Figure 1 represents a side elevation of my cable in perspective. Figs. 2 and 3 represent cross-sections thereof, showing different forms of the ribs, with a series of insulated wires or conductors extending longitudinally through the tubular body.

The cable is constructed of a tubular body, of lead or other ductile material, having a series of ribs, $a$, through which extend the wires or conductors $c$, which are surrounded by insulating material $b$. The grooves $k$ between the ribs may be of any desired depth and shape, as indicated in the respective figures. The central passage may be corrugated, as shown in Fig. 3, for a group of wires for telephonic purposes, or it may be plain for the reception of a heavy wire sufficiently large to convey the strong current necessary for electromotors or the production of the electric light and other like purposes, as shown in Figs. 1 and 2, and which will form subject-matter of a new application to be hereafter filed.

The cable may be twisted throughout its entire length about one turn to every ten feet, more or less, to resist the tensile strain upon any particular outer wire when the cable is coiled for storage. When constructed in the manner indicated the cable is flexible and readily accommodates itself to undulation or irregularities of the trench in which it is placed when used as an underground-line, and requires no other preparation, whether the soil be wet or dry, and it may be laid but a few inches below the surface, as, owing to its flexibility, it will yield with any movement of the earth caused by change of temperature or other causes, which is an important advantage over the non-yielding conductors or carriers.

The cable is constructed by the usual means—viz., in a lead-pipe press with dies of peculiar construction to suit the configuration of the cable to be made.

Having thus described my invention, what I claim, and desire to secure by Letters Patent, is—

An electric cable composed of a tubular body of lead or other ductile material, having external longitudinal ribs and two or more series of concentrically-grouped insulated wires extending through said body, each wire of the outer series extending through one of the ribs of the cable, substantially as specified.

In testimony that I claim the foregoing as my own I affix my signature in presence of two witnesses.

RICHARD S. WARING.

Witnesses:
W. H. COLDREN,
J. W. MARSH.